Patented Aug. 24, 1948

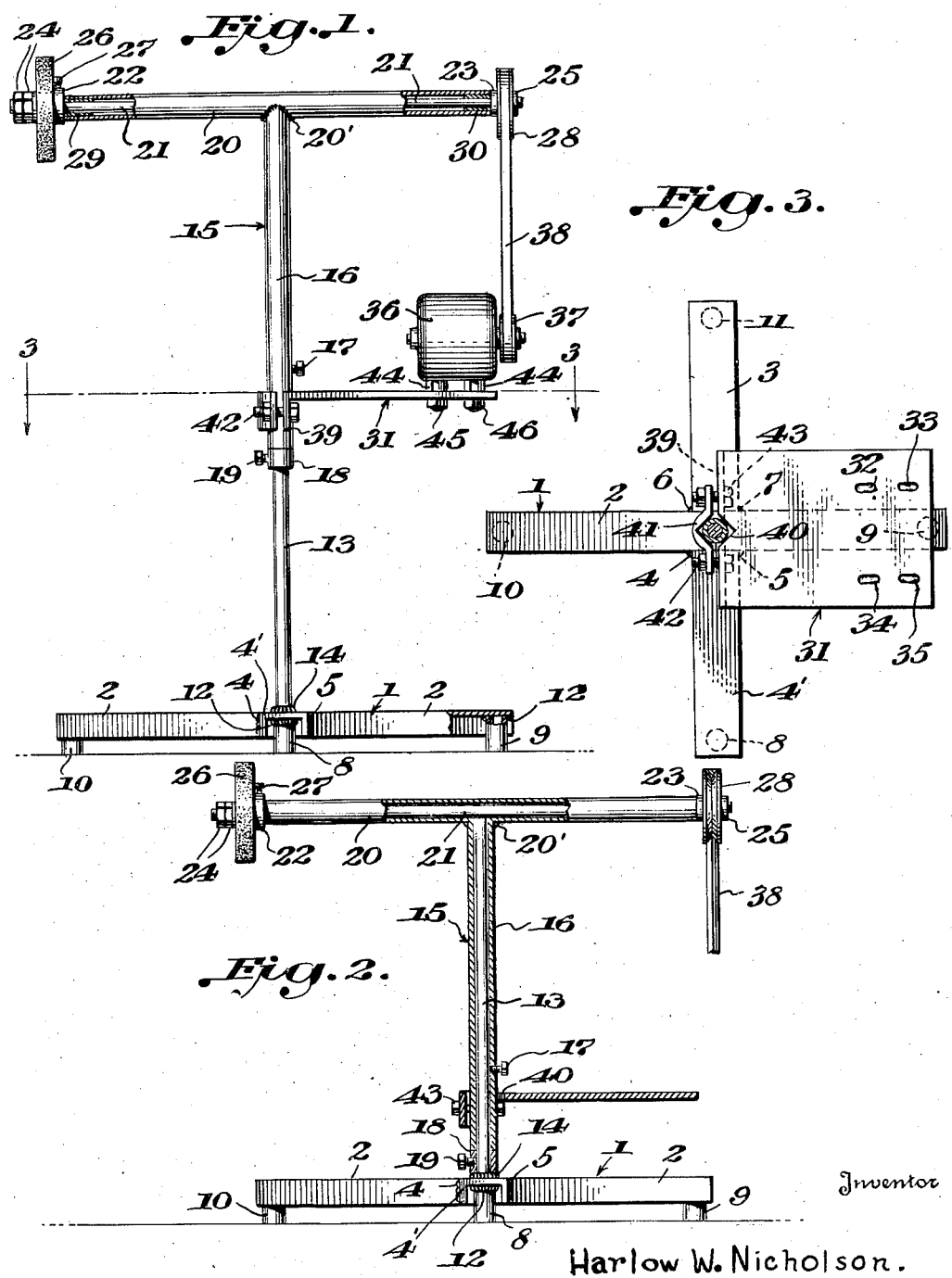

2,447,618

UNITED STATES PATENT OFFICE 2,447,618

PORTABLE GRINDING STAND

Harlow W. Nicholson, Elwood, Ill.

Refiled for abandoned application Serial No. 688,437, August 5, 1946. This application October 29, 1947, Serial No. 782,859

3 Claims. (Cl. 51—166)

This invention relates to improvements in portable grinding or abrading stands and it is the purpose of this invention to provide a stand the parts of which are both detachable and adjustable whereby disk harrows may be sharpened without removing the disk blades from the harrow.

It is also an object of this invention to provide a motor support comprising a platform upon which the motor may be adjustably supported and leveled.

It is a further object of this invention to provide a construction that may be manufactured in large quantities at a low initial cost.

Other objects and advantages will be revealed in the detailed description of the accompanying drawings which form a part of this specification.

In the drawings:

Fig. 1 is a view in side elevation with portions of the shaft support shown in vertical longitudinal section.

Fig. 2 is also a view in side elevation with portions thereof in vertical longitudinal section, the upper portion of the stand being adjusted to its lowermost position.

Fig. 3 is a view in transverse section taken approximately on the line 3—3 of Fig. 1 looking in the direction of the arrows.

The drawings are merely illustrative of the essential parts and portions of my invention and are not definitive thereof except as pointed out in the subject matter claimed herein.

The reference characters identify the parts and portions specified in the detailed description of the drawings.

In the drawings the base 1 is made up of one long part 2 and short parts 3 and 4' preferably made of suitable channel iron or steel. The adjacent ends of parts 3 and 4' are welded to the long part 2 as clearly indicated at 4, 5, 6 and 7. The free remote ends of the parts or members 2, 3 and 4' are provided with upright foot portions 8, 9, 10 and 11 which are welded to the base members, as shown at 12.

The base 1 is provided with an upright standard or shaft 13 having its lower end welded to the member 2 as shown at 14. The shaft 13 is substantially at right angles to the base 1 and forms therewith the lower section of my stand construction.

The upper portion of the stand is constructed of tubular material united to form a T-shaped section 15. The leg or upright portion 16 of the T-shaped section telescopically receives the upright standard 13. The leg 16 is provided with a set screw 17 to prevent rotation of the leg 16 about the standard 13 when such a condition may be required. The leg 16 is secured to tubular support 28 by welding the same together, as shown at 20'.

In order to maintain a selected elevational adjustment the standard 13 is provided with a collar 18 having a set screw 19. The collar 18 is slidable along the standard 13 and may be secured in any desired position of adjustment by the set screw 19. Of course, vertical or elevational adjustment may also be made by the use of the set screw 17.

The horizontal portion 20 of the T-shaped section 15 contains a horizontal shaft 21 which is screw threaded at both ends to receive locking collars 22, 23 and locking nuts 24 and 25. The grinding or abrading wheel 26 is secured axially on the shaft by a locked collar 22 and locking nuts 24. The collars may be keyed in adjusted positions or they may be secured in adjusted positions by a set screw as shown at 27.

The pulley, preferably a V-pulley, 28 is secured on the other end of the shaft 21 by means similar to or identical with the means to secure the wheel 26 in fixed axial position on the shaft 21, or the pulley may be keyed on the shaft.

The shaft 21 is supported preferably in babbit bearings 29 and 30.

The leg 16 is provided with an adjustable platform 31 constituting a support for an electric motor 36, located as shown, in the drawings directly, but in spaced relation, below the shaft 21. One end portion of the platform 31 is provided with slotted portions 32, 33, 34, 35 whereby the motor 36 and its V-shaped pulley 37 may be adjusted to alignment with the V-pulley 28. The pulleys are operatively connected to each other by the V-belt 38 as clearly shown in Fig. 1.

One end of the platform 31 is provided with an interrupted flange 39 produced by a substantially centrally located notched portion 40. In order to adjustably secure the platform 31 on the leg 16 a notched clamping bar 41 is used.

Both the clamping bar 41 and the interrupted flange 39 are provided with two pairs of apertures. Each pair being arranged in alignment to receive clamping bolts 42 and 43. The clamping means for the platform 31 provides for distance adjustment of the motor 36 and its pulley 37 relative to the pulley 28 whereby the proper adjustment of the belt 38 may be readily maintained for successful operation.

The motor 36 is supported on sets of shims 44. Bolts 45, 46 etc., pass through apertured ears on the motor casing and also through the shims 44 and the slotted portions 32, 33, 34 and 35 of the platform. The use of shims provides for both leveling and adjusting the motor 36 relative of the platform 31 and relative of the pulley 28. It it to be noted that I have provided a triple adjustment means for the motor 36 relatively of the pulley 28.

The beveled edge portions of the interrupted flange 39 bear directly against the tube 16 and prevent the platform 31 from sagging when in clamped position.

The use of guards for the grinding wheel 26, the pulleys 28 and 37, and the belt 38 is contemplated, but are not shown on the drawings.

Other varieties of grinding wheels, not shown, such as a sickle grinding wheel, may be substituted when it is desired to do sickle grinding.

Since the motor 36 is detachable from the stand, it may be removed therefrom and used for other purposes.

When it is desired to grind the disk of a disk harrow, the harrow is placed upon a suitable platform, not shown, so that the work is suitably accessible to the operator or operators. At least, one disk section of the harrow is supported in sufficiently elevated position so that it may be rotated by hand or otherwise. With the disk section in the position above described the disks are ready for grinding without removing them from the harrow.

The portable grinding stand is now brought into position by whatever adjustments may be found necessary to bring the circumference of the grinding wheel 26 into proper sharpening contact with a single disk. As the grinding proceeds the disk section is rotated so that the sharpening may be accomplished accurately and uniformly. After one disk is sharpened my portable grinder stand is shifted to the next disk of the harrow section being operated upon and this disk sharpened in the same way as the first disk. This operation is repeated until all of the disks on all of the sections of the harrow are sharpened.

It is to be noted that my new portable stand is provided with ample adjusting means whereby the grinding wheel may be adjusted to any particular position both as to elevation and as to angularity.

The elevational adjustment is accomplished by the collar 18 and its set screw 19.

The angular adjustment is accomplished by the set screw 17 which impinges against the standard 13 and prevents relative rotation of the leg 16 and the standard 13.

If free swinging of the top section 15 is desired it is merely necessary to loosen the set screw 17.

When the work or object to be ground cannot be moved to the grinding wheel 26, the T-section may be removed from the base section and carried to the work and held in operative grinding position thereon.

The platform 31 is reversible, that is, it may be used either side up as a matter of choice to suit conditions. The reversibility affords an additional adjustment not previously pointed out, whereby adjustments may be made to different lengths of transmission belts.

This is a refiled application of Harlow Nicholson, Serial No. 688,437, filed Aug. 5, 1946, for Portable grinding stands. Said application inadvertently became abandoned Aug. 7, 1947.

Having fully described my invention and the operation thereof, what I claim is:

1. A portable grinding stand, said stand comprising upper and lower sections, said upper section being composed of tubular stock secured together to form a T-shaped member, the lower section having a base supporting a standard substantially at a right angle thereto and located centrally thereon, the leg of the T-shaped member telescopically receives the standard of the lower section, the standard is provided with means adjustably mounted thereon to maintain the elevational adjustment of the T-shaped member which it engages and supports, the leg of the T-shaped member forms the support for a motor platform adjustably secured thereto, the horizontal portion of the T-shaped member contains and supports a rotatable shaft, one end of said shaft being provided with an abrading wheel secured thereon, the opposite end of the shaft being provided with a pulley fixedly secured thereon, in combination with an electric motor mounted on said platform, said motor having a driving pulley in alignment with the pulley on the rotatable shaft, said pulleys being operatively connected by a suitable transmission belt.

2. In a portable grinding stand, said stand comprising upper and lower detachable sections, said lower section composed of cross members rigidly secured together and supporting a standard centrally thereof and substantially at right angles thereto, the upper section being composed of tubular stock, said stock being rigidly secured together to form a T-shaped member the leg of which telescopically receives the standard of the lower section, in combination with means penetrating said leg and impinging against said standard to prevent angular movement between said sections, said standard having means thereon to support said upper section when said angular movement preventing means is loosened.

3. In a portable grinding stand, said stand having upper and lower sections telescopically and detachably connected together, said upper section being composed of tubular stock secured together in the form of a T-shaped member, the leg of the T-shaped member being welded to the cross portion of said member to make a firm and rigid connection therewith, said cross portion having a shaft supported therein by babbit bearings, said shaft having means thereon for securing a grinding wheel on one of its ends and a driven pulley on the opposite end thereof, said leg having a motor suporting platform adjustably secured thereto and supporting a motor thereon with its driving pulley in alignment with the shaft pulley, said pulleys being operatively connected by a suitable transmission belt.

HARLOW W. NICHOLSON.